Feb. 23, 1971 T. SEKSE ET AL 3,566,351
DATA COMMUNICATION APPARATUS
Filed May 5, 1967 11 Sheets-Sheet 1

INVENTORS.
TORKJELL SEKSE
WALTER BANZIGER

| | B | (A) | A | 8 | 4 | (2) | 2 | 1 |
|---|---|---|---|---|---|---|---|---|
| 1 | 0 | 1 | 0 | 0 | 0 | 1 | 0 | 0 |
| 2 | 0 | 1 | 0 | 0 | 0 | 1 | 0 | 1 |
| 3 | 0 | 1 | 0 | 0 | 0 | 0 | 1 | 0 |
| 4 | 0 | 1 | 0 | 0 | 0 | 0 | 1 | 1 |
| 5 | 0 | 1 | 0 | 0 | 1 | 1 | 0 | 0 |
| 6 | 0 | 1 | 0 | 0 | 1 | 1 | 0 | 1 |
| 7 | 0 | 1 | 0 | 0 | 1 | 0 | 1 | 0 |
| 8 | 0 | 1 | 0 | 0 | 1 | 0 | 1 | 1 |
| 9 | 0 | 1 | 0 | 1 | 0 | 1 | 0 | 0 |
| 10 | 0 | 1 | 0 | 1 | 0 | 1 | 0 | 1 |
| 11 | 0 | 1 | 0 | 1 | 0 | 0 | 1 | 0 |
| 12 | 0 | 1 | 0 | 1 | 0 | 0 | 1 | 1 |
| 13 | 0 | 1 | 0 | 1 | 1 | 1 | 0 | 0 |
| 14 | 0 | 1 | 0 | 1 | 1 | 1 | 0 | 1 |
| 15 | 0 | 1 | 0 | 1 | 1 | 0 | 1 | 0 |
| 16 | 0 | 1 | 0 | 1 | 1 | 0 | 1 | 1 |
| 17 | 0 | 0 | 1 | 0 | 0 | 1 | 0 | 0 |
| 18 | 0 | 0 | 1 | 0 | 0 | 1 | 0 | 1 |
| 19 | 0 | 0 | 1 | 0 | 0 | 0 | 1 | 0 |
| 20 | 0 | 0 | 1 | 0 | 0 | 0 | 1 | 1 |
| 21 | 0 | 0 | 1 | 0 | 1 | 1 | 0 | 0 |
| 53 | 1 | 0 | 1 | 0 | 1 | 1 | 0 | 0 |
| 54 | 1 | 0 | 1 | 0 | 1 | 1 | 0 | 1 |
| 55 | 1 | 0 | 1 | 0 | 1 | 0 | 1 | 0 |
| 56 | 1 | 0 | 1 | 0 | 1 | 0 | 1 | 1 |
| 57 | 1 | 0 | 1 | 1 | 0 | 1 | 0 | 0 |
| 58 | 1 | 0 | 1 | 1 | 0 | 1 | 0 | 1 |
| 59 | 1 | 0 | 1 | 1 | 0 | 0 | 1 | 0 |
| 60 | 1 | 0 | 1 | 1 | 0 | 0 | 1 | 1 |
| 61 | 1 | 0 | 1 | 1 | 1 | 1 | 0 | 0 |
| 62 | 1 | 0 | 1 | 1 | 1 | 1 | 0 | 1 |
| 63 | 1 | 0 | 1 | 1 | 1 | 0 | 1 | 0 |
| 64 | 1 | 0 | 1 | 1 | 1 | 0 | 1 | 1 |

Fig. 7

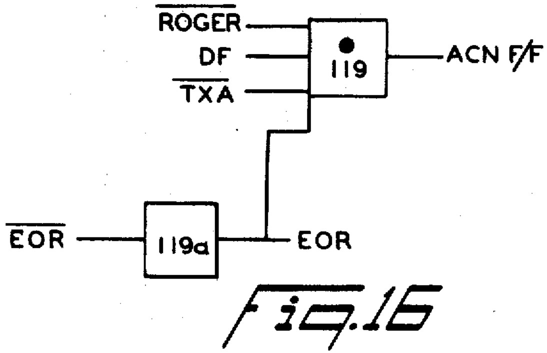
FIG. 16
| | BCD | CONVERSION | |
|---|---|---|---|
| | 0000 | → 1010 | ERROR |
| 1 | 0001 | ↔ 1011 | |
| 2 | 0010 | | |
| 3 | 0011 | | |
| 4 | 0100 | | |
| 5 | 0101 | | |
| 6 | 0110 | | |
| 7 | 0111 | ↔ 1101 | |
| 8 | 1000 | ↔ 1100 | |
| 9 | 1001 | | |
| ø | 1010 | | |
| | 1011 | | ERROR |
| | 1100 | | ERROR |
| | 1101 | | ERROR |
| | 1110 | | ERROR |
| | 1111 | | ERROR |
FIG. 8
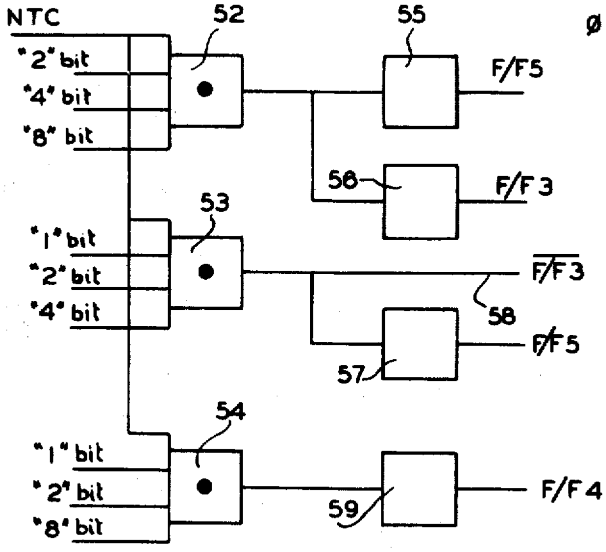
FIG. 9
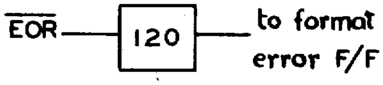
FIG. 20
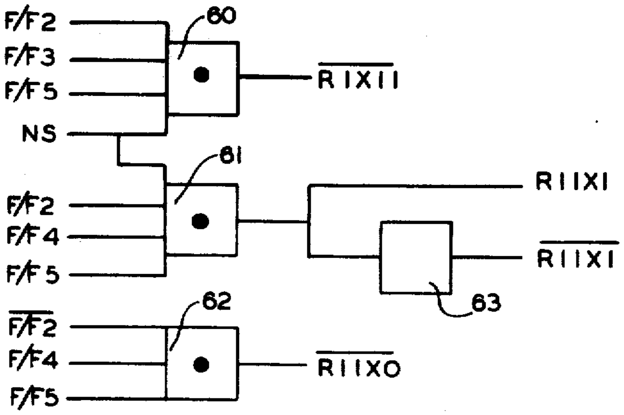
FIG. 10

United States Patent Office 3,566,351

Patented Feb. 23, 1971

3,566,351

DATA COMMUNICATION APPARATUS

Torkjell Sekse, Marcy, and Walter Banziger, Utica, N.Y., assignors to Mohawk Data Sciences Corporation, Herkimer, N.Y., a corporation of New York Filed May 5, 1967, Ser. No. 636,403
Int. Cl. H04l 1/10, 7/02
U.S. Cl. 340—146.1 18 Claims

ABSTRACT OF THE DISCLOSURE

Data communication apparatus for use with standard communication terminal facilities and operable as either a transmitter or receiver. The apparatus provides a synchronizing system that is more tolerant of line distortions than other known asynchronous equipment. Synchronization of the receiver's oscillator with that of the transmitter occurs whenever there is a positive or negative change in the data being received. Special transmission codes are employed to guarantee changes at intervals of no more than four bit times. The special codes also provide a means for making effective alpha and numeric validity checks and result in increased data transmission speeds.

CROSS REFERENCE

The apparatus of the invention includes as a fundamental part thereof a data recording machine of the type disclosed in co-pending application Ser. No. 541,450, filed Mar. 30, 1966 by George R. Cogar et al.

BACKGROUND OF THE INVENTION

This invention relates generally to data communication, and has particular reference to novel apparatus for transmitting or receiving data at high character rates over standard communication facilities.

Most of the magnetic tape communication terminals known to the applicants are relatively high cost, single-use terminals adapted only to transmit and/or receive data. The apparatus of the invention can record, verify, transmit or receive data. When not utilized for data transmission or reception, the apparatus can be used for routine data transcribing and verifying on computer magnetic tape. The equipment is thus more efficient and can be operated at a lower cost.

In addition to being more versatile and economical than prior art tape terminals, the communication equipment of the invention has a synchronizing system that is more tolerant of line distortions than other known asynchronous equipment, and provides for special codes which enable transmission of the data at higher than normal throughput speeds.

SUMMARY OF THE INVENTION

As mentioned above, the apparatus of the invention includes a data recording machine as disclosed in co-pending application Ser. No. 541,450, the function of said machine being to read from tape the data to be transmitted and to store the data in its core memory. Another portion of the apparatus then encodes the data in memory into a transmission code which is validated and decoded by the receiving apparatus. After decoding, the receiving apparatus, which is identical to the transmitting apparatus, sends the data to its core memory and the information can then be written on tape. A modem such as a commercially available Bell 202C modem or its equivalent is used to link the apparatus of the invention to the telephone communication network.

Automatic error detection and correction are provided for by the apparatus. Thus, complete checking logic is built into the apparatus but if error conditions persist, operator intervention is required.

An advantage of the communication apparatus of the invention is that it is more tolerant of line distortions than other known asynchronous equipment, this being made possible by the use of special transmission codes which guarantee synchronization of the receiving oscillator with the sending oscillator at intervals of not over four bit times. The special codes also permit a higher speed of transmission and enable alpha and numeric validity checks to be made. Other advantages are that the apparatus provides for alternate odd and even start patterns before sending successive odd and even data records and requires proof of same as a check; provision is made for the absence of the supervisory channel between consecutive records; the apparatus permits programmed numeric and alpha data to be transmitted in any intermixed combinations desired, selective transmission and rearrangement of data also being permitted; means are provided whereby the sending terminal checks data programmed for numeric transmission and signals error if a non-allowable numeric is present; and the apparatus provides for a momentary by-pass switch which allows one error to be transmitted.

The principal object of the present invention is to provide data communication apparatus that can operate at high speed more reliably and economically than has been possible with previously available asynchronous equipment. Contributing to the attainment of this objective are the advantages listed above, together with others that will become apparent from a reading of the detailed description that follows.

BRIEF DESCRIPTION OF THE DRAWINGS

FIG. 7 is a fragmentary chart illustrating the special alpha transmission code;

FIG. 8 is a chart illustrating the special numeric transmission code;

FIGS. 9 and 10 are simplified logic diagrams illustrating the means for converting to and from the special numeric transmission code;

FIGS. 16 and 17 are simplified logic diagrams illustrating the means by which the supervisory signal is utilized to insure that transmitter and receiver are in step.

FIG. 20 is a logic representation of a one shot device which permits the transmission of an error record.

DESCRIPTION OF THE PREFERRED EMBODIMENT

In general, when the apparatus of the invention is to transmit a message, it reads a record or block of data that was previously written on magnetic tape, checks the parity of the data read and, if there is no error, enters the data in its magnetic core memory. Thereafter, when the receiving apparatus indicates that it is ready, the transmitter encodes the data into a special transmission code which is sent to the telephone data set or modem. From the data set of the transmitting apparatus, the data travels over the line to the data set of the receiving apparatus. At the receiving station, the transmission code is validated and decoded with the decoded data being stored in the receiver's memory. Thereafter, the data in memory can be written on tape for use at the receiving station.

Figure 1:
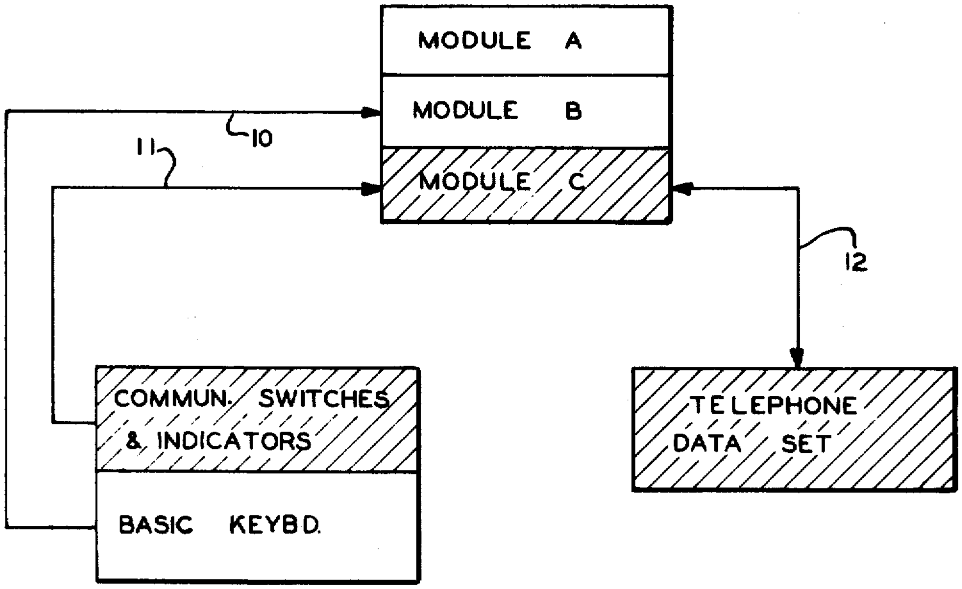
FIG. 1 is a block diagram illustrating the principal components of the apparatus of the invention.
Figure 2:
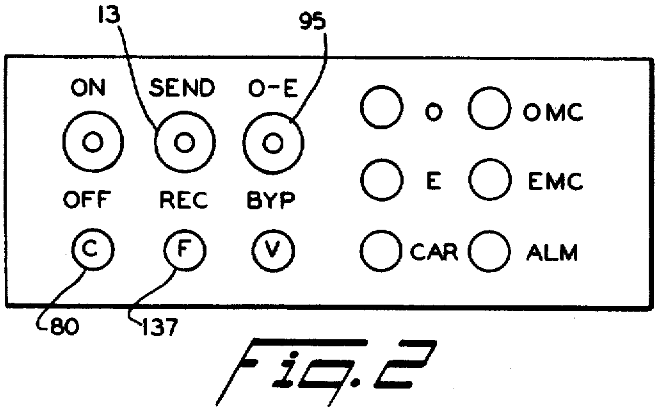
FIG. 2 is a schematic illustration of the communication switches and indicators on the keyboard.

The block diagram of FIG. 1 illustrates in simplified form the principal components of the communication apparatus. The basic keyboard and modules "A" and "B" are parts of the data recording machine disclosed in the previously mentioned co-pending application Ser. No. 541,450 and thus do not per se form a part of the present invention. As indicated, the keyboard is connected by cable 10 to module "B," the modules "A" and "B" containing on printed circuit cards the control and logic circuitry for the data recording machine. Module "C" contains the circuit cards for the communication logic circuitry, and this module is connected by cable 11 to the communication switches and indicators that have been added to the basic keyboard. The portion of the complete keyboard having the communication switches and indicators is schematically illustrated in FIG. 2.

As shown in FIG. 1, module "C" is connected by another cable 12 to a telephone data set such as a Bell 202C or its equivalent. Whatever manufacture of set is used, it must operate bit and character serial, operate asynchronously and have supervisory channel option wired. With proper switch settings, the apparatus of FIG. 1 can be used to transmit or receive, the mode of the apparatus being controlled by a mode switch 13, FIG. 2.

The appratus disclosed herein is designed for attended operation, and voice communication is also provided for between the transmitting and receiving stations. With a Bell 202C data set, the transmission rate is 1200 bits per second when a direct distance dial line is used and 1600 bits per second over a private line. The data is transmitted as an 80 character record or message with four bits being transmitted for each numeric character and eight bits for all other characters. Using this bit structure, the approximate per minute transmission rate for 80 character messages is 70 alphabetic or 100 numeric messages. The actual rate of transmission depends on several different factors such as the relative number of alpha and numeric characters in a message and the total number of characters in the message.

The messages that are transmitted can be programmed, and odd program codes (1, 3 or 5) are used to transmit all characters having 8 bits while even program codes (Ø, 2 or 4) are used to transmit numeric characters 0–9 only, the latter having 4 bits per character. As noted above, the speed of transmission is materially affected by the number of bits being transmitted, and maximum transmission rates are not realized when all code 1's are used for mixed characters. A group of messages can have fields added, deleted or changed (a delete and an add). However, the fields added, deleted or changed must be constant for the entire group.

To initiate operation of the communication apparatus of the invention, voice contact is first established between the sending and receiving stations whereby the time for transmission, the programming, etc. are agreed upon. Following the voice communication, the apparatus at each station is conditioned to send or receive, and the program is entered into program memory. With both stations activated, the data sets are switched to DATA mode and transmission begins.

At the start of the transmission, the transmitting station sends the receiving station one of two special message codes, i.e., either an ODD or an EVEN message code. At least three of these codes will be sent to condition the receiver to receive data and to make certain that the line connection is good. After the receiver has successfully received three or more of the special message codes, it sends the transmitter a signal announcing its readiness to receive data.

Upon receiving the last-named signal, the transmitting apparatus sends the receiver a special ODD or EVEN sentinal code. This tells the receiver that data will follow so the receiver conditions itself to receive it. The transmitter then proceeds to send a record of data at the end of which a bit count—a tally of all the "1" bits sent—is transmitted. This is called the validity count, and the receiver will check the validity count it has generated against the one received. The two should be the same and if not, the receiver will call for a retransmission in a manner to be explained.

During the transmission of the data record, each character is checked by the apparatus to see that it is proper for the program stored in program memory. If no errors have been indicated following the transmission of a record, the receiver acknowledges receipt whereupon the transmitter will read the next tape record into memory and the receiver writes the record just received on tape. Following this, the receiver discontinues the supervisory transmit data signal (to be explained), and the above-described procedure is repeated for the next record to be transmitted, the transmission continuing until all messages have been sent.

Figure 3:
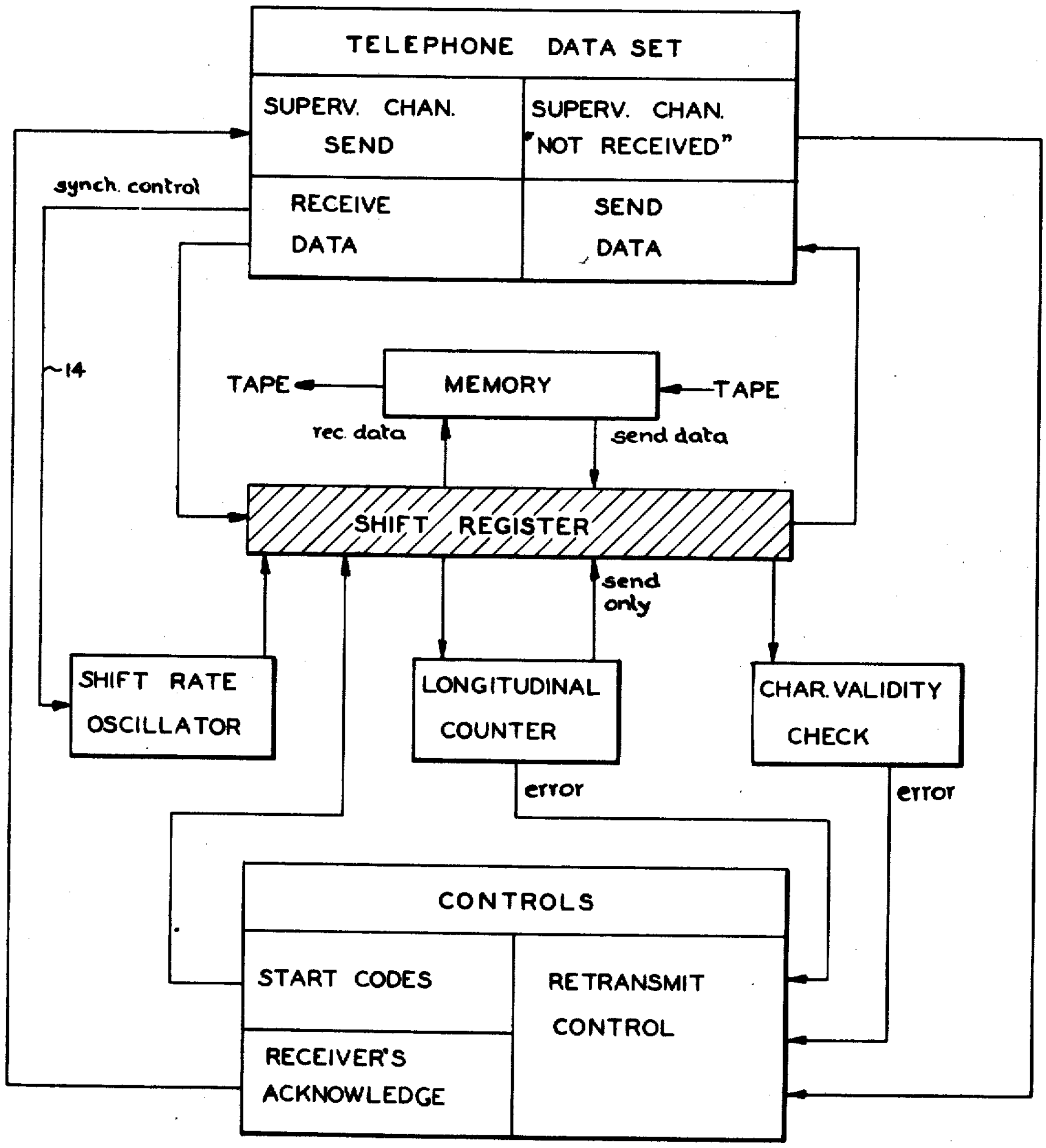
FIG. 3 is a block diagram illustrating data travel routes in the apparatus.

FIG. 3 is a block diagram which illustrates in a simplified form the routes traveled by the data in the communication apparatus and also the manner of operation of some of the controls. The diagram is arranged to show data travel for both the transmitting and receiving modes of the apparatus and therefore a number of parallel paths appear. The heart of the communication logic is a shift register having nine flip-flops. The main purpose of this register is to convert from bit parallel to bit serial or vice versa, i.e., from the parallel arrangement of a tape frame to the serial arrangement required to send the data over the telephone line.

There are numerous paths in and out of the shift register for sending and receiving purposes. Included among these are parallel shift paths between the memory of the data recording machine and the shift register for data flow in either direction. There are also bit serial connections between both ends of the shift register and the telephone data set.

As can be seen from the FIG. 3 diagram, when the apparatus is used to transmit, the data travel is from tape to memory to the shift register where the characters are converted from a bit parallel to a bit serial arrangement. From the shift register to travel, in bit serial form, is to the data set and from thence over the line to the data set of the receiver. At the receiving station the data travel is the opposite of that just described, i.e., it is from the data set to the shift register (to convert back to bit parallel) and then to memory and tape.

The frequency of the shift register is controlled by a shift rate oscillator at a nominal rate of 1200 bits per second, said oscillator being shown in block form in FIG.

3. As indicated in this drawing, when the apparatus is used for receiving, an additional line 14 from the data set will synchronize the receiving oscillator with the sending oscillator in a manner to be explained hereinafter. This is necessary since the oscillators in the sending and receiving units would otherwise run at different rates because of different component tolerances.

Other data paths shown in FIG. 3 are between the shift register and a longitudinal counter and between the register and a character validity checker. The longitudinal counter produces the validity count which, as noted above, is a tally of all the "1" bits in a transmitted record. The longitudinal counter of the transmitting apparatus will take the final bit count and return it to the shift register for sending to the receiver as the last character of a message, whereas at the receiver the longitudinal count at the end of a record is simply compared with the one received.

The character validity checker checks for format errors at the transmitter and character errors at the receiver. A format error will occur when an alpha or special character occupies a position programmed for a numeric character. A blank (no bits) in data memory will also cause a format error. A character error will occur at the receiver if an 8 bit (alpha or special) character is received in a position programmed for a 4 bit (numeric) character, or vice versa. A character error can also be the result of a noisy line causing an invalid combination of bits (to be explained) to be generated at the receiving station.

The character validity checker is a limited check only and will, along with validity count errors, cause a retransmission of the message through the basic controls of the apparatus. Thus, the receiver, using the supervisory control data, will call for a retransmission. The transmitter will then revert to the point of the previous start code and continue by repeating the previous message from the beginning. The start of a repeated message is identical to the start of a message that follows an acknowledged message.

As noted above, the frequency of the shift rate oscillator of the receiver must frequently be synchronized with the frequency of the shift rate oscillator of the transmitter to prevent the oscillators from running at different rates because of component tolerances. The manner in which this synchronization is accomplished is an important feature of the invention and results in apparatus that is more tolerant of line distortions than other known equipment. Thus, means are provided to correct the receiving oscillator's frequency at both positive and negative changes in the data being received or, stated in another way, whenever there is a change in the wave form of the incoming data. Moreover, so that there will be changes in the data wave form with the frequency desired, special transmission codes are employed which guarantee changes at intervals of no more than four bit times.

In order to have the guaranteed data wave form changes just described, there can never be more than four consecutive "0" bits or four consecutive "1" bits in a continuous succession of transmission codes. This in turn means that there must be special numeric and alpha codes which have no more than two consecutive bits of the same kind so that consecutive characters in any combination cannot cause more than four consecutive bits of the same kind to appear. The manner in which known alpha and numeric codes are converted or translated into the special codes will be explained presently.

Figure 4:
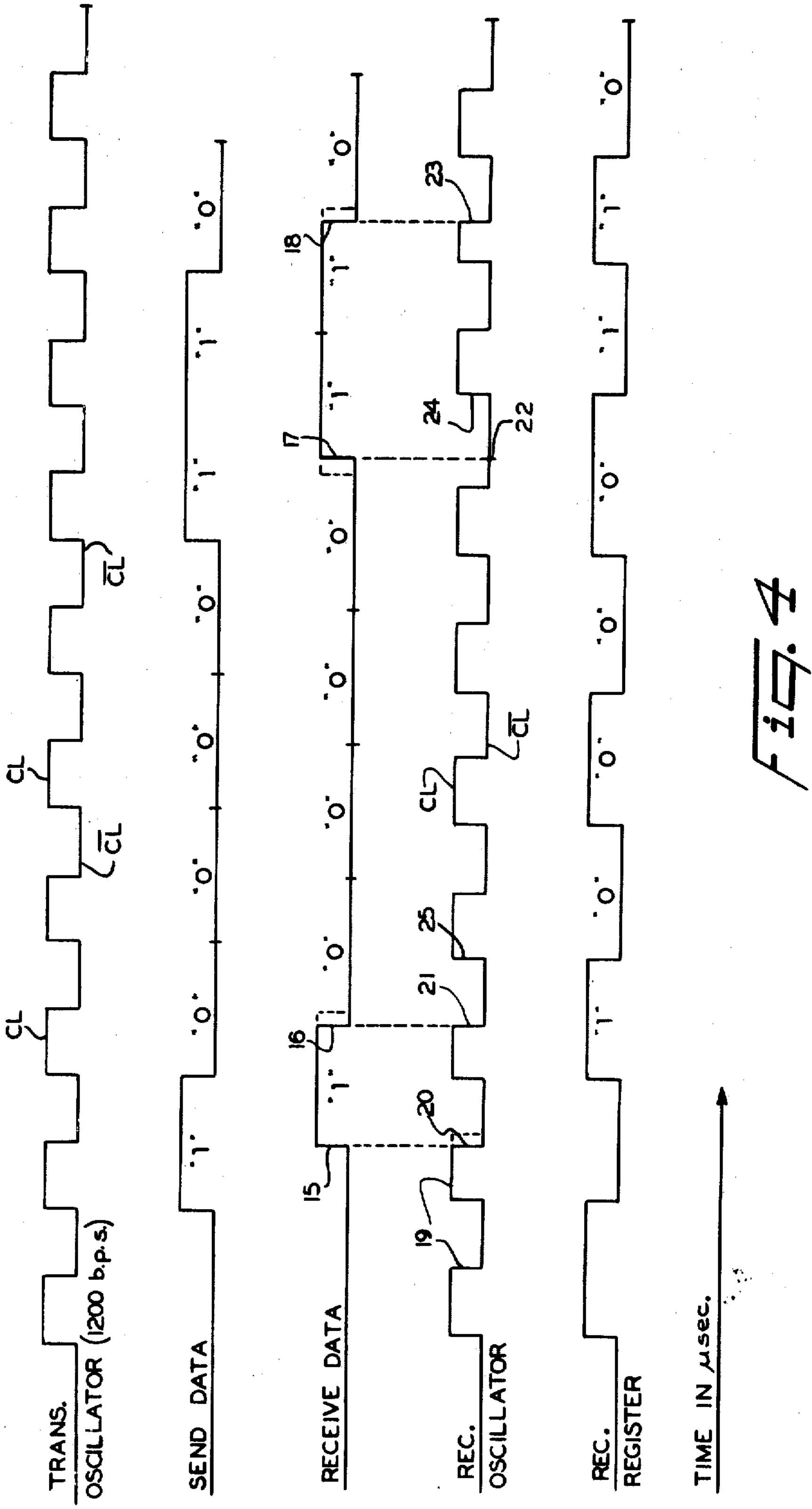
FIG. 4 is a timing chart illustrating the manner in which the receiver oscillator frequency is corrected.

Correction of the frequency of the receiver oscillator is illustrated by the timing chart of FIG. 4. In this chart, in which time in microseconds is measured along the horizontal axis, the wave form of the transmitter oscillator or clock is shown at the top, the oscillator's frequency being a nominal 1200 bits per second. The oscillator, in both the transmitter and receiver, controls the shift register and also the initiation of the memory cycle of the data recording machine. Shown below the transmitter oscillator wave form is the wave form of the data being transmitted, the portion illustrated being a "1" bit, four consecutive "0" bits (the maximum allowable), two consecutive "1" bits and then a "0" bit.

Below the wave form of the data being sent, in the FIG. 4 chart, is the wave form of the data arriving at the receiver. This is essentially the same for data sent but the wave form as a whole is displaced to the right because of propagation time, or the time required for a pulse to travel from the sending to the receiving data set. In addition, distortions often appear in the wave form of the data being received due to noise or carrier frequency conversion jitter, the distortions appearing where the wave form changes as at 15, 16, 17 and 18 on the chart. Thus, assuming that the receiver oscillator was cycling as shown at 19 in the first part of its wave form, the change or shift in the receive data wave form is early at 15, early again at 16, late at 17 and then early at 18, the normal duration of a bit pulse (bit time) being equal to one clock cycle.

Referring now to the receiver oscillator, it can be seen that its wave form is corrected, i.e., synchronized with the transmitter oscillator, each time there is a change (positive or negative) in the wave form of the incoming data. Thus, correction is made at points 20, 21, 22 and 23, the correction always occurring at the negative transition of the oscillator. Correction at the negative transition will occur whether the data shift is ahead (as at 15, 16 and 18) or after (as at 17) the point where the negative transition would normally occur, and the following positive transition will always occur at and sample the data the correct distance from the negative transition or "halfway" point. Thus, for example, the distance between points 22 and 24 is the same as the distance between points 21 and 25.

As previously mentioned, the oscillator controls the frequency of the shift register, and the wave form for the register of the receiver is shown just below the receiver oscillator wave form. The shifting of the register is caused by the positive transitions of the oscillator, this being when the clock flip-flop (to be described) sets. Since the information is stable when the clock flip-flop sets, the register shift time is also the time that the data is sampled. While the frequency of the shift register of the transmitter is controlled strictly by its oscillator and is perfectly uniform, the frequency of the receiver shift register is affected to a slight extent by the fact that its oscillator frequency must be continuously corrected throughout the transmission of a message.

Figure 5:
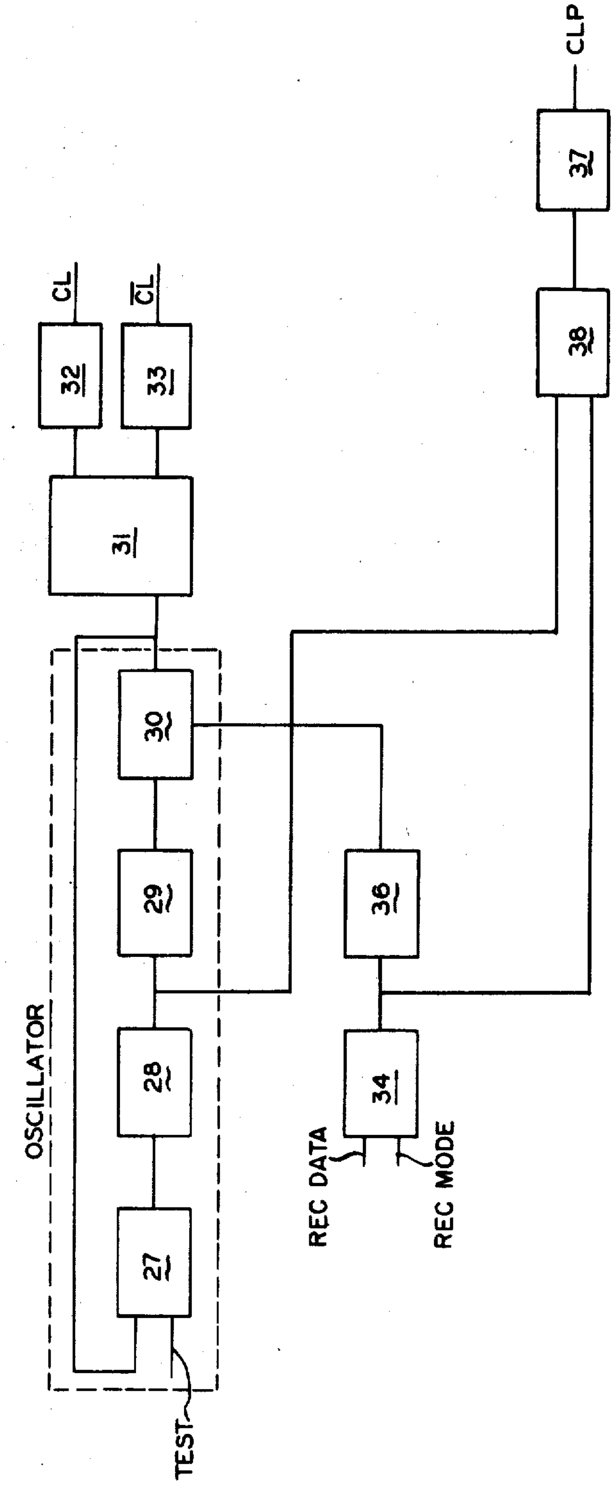
FIG. 5 is a simplified logic diagram illustrating the synchronization control for the apparatus.

The above described synchronization control of the communication apparatus, including the shift rate oscillator and clock flip-flop, is illustrated by the logic diagram of FIG. 5. The oscillator is comprised of components 27, 28, 29 and 30. Component 30 controls the clock flip-flop designated by the reference number 31. The clock flip-flop provides a symmetrical output of positive and negative signals CL and $\overline{CL}$ (see FIG. 4), these signals being the outputs of components 32 and 33 in FIG. 5. Signals CL and $\overline{CL}$ are used throughout the operation of the apparatus and may also be referred to as clock "shift-time" and clock "half-time," respectively.

When the control logic of FIG. 5 is in the receiver the incoming data enters component 34, and whenever there is a change in the wave form a differentiated change corrects the oscillator through component 36. As noted above, the corrections occur at "half-time" with the result that the clock flip-flop resets. Component 34 is an "and" gate, the other input of which is rendered permissive when keyboard switch 13, FIG. 2, is in the receive mode position.

Figure 6:
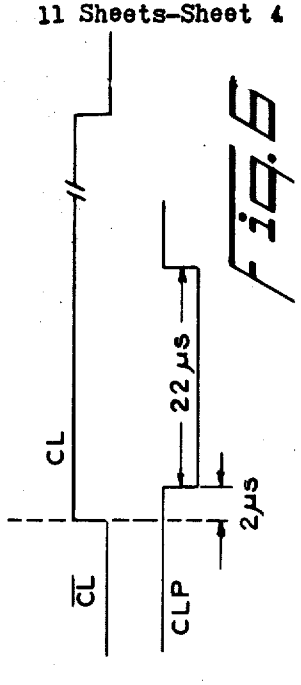
FIG. 6 is a fragmentary timing chart illustrating the relation of the clock pulse to clock "shift-time"

The FIG. 5 logic shows an output at component 37 that is designated CLP for clock pulse. The CLP signal is slightly delayed and has a controlled width. Thus, an inductor in component 28 will cause a delay to component 38 of 2 microseconds and a width of 22 microseconds. As shown in FIG. 6, the signal CLP will therefore appear 2 microseconds after "shift-time" and last for 22 microseconds providing a delay that permits the shift register and translation networks (to be described) to stabilize before the data is sampled.

As noted above, the thing that enables correction of the receiving oscillator's frequency at intervals of no more than four bit times is the provision by the invention of special transmission codes. Thus, a special alpha transmission code is obtained by converting or translating the standard six bit BCD code into a novel eight bit code. This is accomplished by inserting in the standard code the complements of the "2" and "A" bits following transmission of those bits.

The special alpha transmission code is illustrated by the fragmentary chart of FIG. 7 where the "2" and "A" bit complements are in columns headed by the designations (2) and (A). The letter G (chart, #56), for example, which is 110111 in the BCD code would be transmitted as 10101011, starting with the "B" bit. As another example, a code of all 1's (chart, #64) would be transmitted as 10111011, starting with the "B" bit. With this conversion, as can be seen from the chart, no more than two consecutive bits of the same kind will ever be present at the ends of a character so that consecutive characters in any combination cannot cause more than four consecutive bits of the same kind to appear.

The special numeric transmission code is a four bit code which uses the "8," "4," "2" and "1" bits only. With reference to the chart of FIG. 8, it can be seen that numeric 1, 7 and 8, which have either three consecutive 1's or three consecutive 0's in the BCD code, violate the rule of no more than two and therefore have been converted to comply with the rule. Conversion is possible because four bits offer the sixteen possibilities shown in the left column of the chart, and some of the otherwise unused possibilities (not having more than two consecutive bits of the same kind) have been appropriated for numeric 1, 7 and 8 as the chart shows. All remaining unused combinations are treated as invalid combinations and cause a character error if received at the receiving station. The four consecutive 0's at the top of the left column are converted for transmission purposes to a 1010 code which is the code for a decimal zero. As indicated by the arrows on the chart, however, when this code is received it is read as a decimal zero and is not converted back as are the codes for the 1, 7 and 8.

Figure 11:
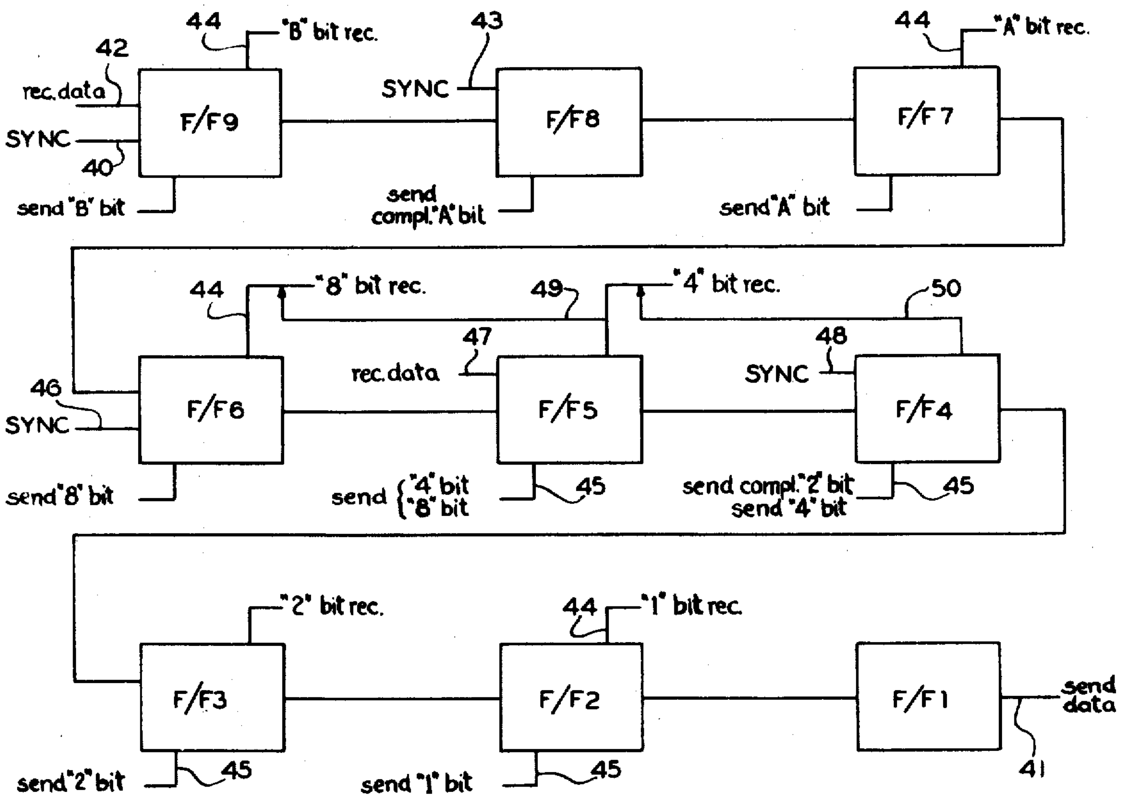
FIG. 11 is a simplified logic diagram illustrating the shift register.

The means for effecting the conversion to the special alpha transmission code are in the previously discussed shift register of which FIG. 11 is a greatly simplified logic diagram. The nine flip-flops of the shift register are designated F/F1, F/F2, etc. When an alpha character is to be transmitted, it is called out of memory to the "A" register of the data recording machine, and from there the "B" bit is sent to F/F9, the "A" bit to F/F7 and the "8," "4," "2" and "1" bits are sent to F/F's 6, 5, 3 and 2, respectively, these inputs being shown at the bottom of the blocks representing the flip-flops. At the same time that the six bit BCD code for the particular character is being loaded into the register, the latter automatically loads the complements of the "A" and "2" bits in F/F's 8 and 4, respectively, and an alpha SYNC bit into F/F9, through an input indicated by the reference number 40.

The SYNC bit is a device which is utilized by the apparatus to separate the characters that are loaded into the shift register. These bits are considered to be 1 bits. They are, however, never transmitted over the line.

After the shift register has been loaded, the code bits are shifted through the register moving to the next lower flip-flop at each "shift-time" of the clock. Thus, on the first shift, the "1" bit in F/F2 is shifted to F/F1 and sent out over the line via the output 41. At the same time, the "2" bit is shifted to F/F2, the "4" bit to F/F3 and so on. This continues until the SYNC bit, which has been trailing the data, reaches F/F2 at which time it signals for the next character in memory to be loaded into the register. In this manner, the shift register sends the data it receives in bit parallel form to the telephone data set in the bit serial form required for telephone line transmission.

When the shift register of FIG. 11 is in the receiving apparatus, the data comes from the receiver's data set and enters the register in serial form through an input 42 at F/F9. The first bit to appear at the input will be the first bit that left the transmitter's shift register, or the "1" bit of the character. Simultaneously with the receipt of this bit at F/F9, an alpha SYNC bit is loaded to F/F8 through an input 43. Thereafter, the data bits are shifted through the register led by the SYNC bit until the latter reaches F/F1.

When the SYNC bit reaches F/F1, this tells the register that it is full and causes its contents to be sent to memory via the "B" register of the data recording machine. Data is taken from the shift register in bit parallel form via outputs 44 shown at the tops of the blocks representing the flip-flops. Conversion from the special eight bit transmission code back to the standard six bit code is accomplished in the receiver by ignoring the bit complement flip-flops F/F4 and F/F8, and it will be seen from the FIG. 11 diagram that no outputs are provided for these flip-flops.

While additional means (to be described) are required for converting to and from the special numeric transmission code, the converted code is shifted through the shift register in substantially the same manner as the alpha transmission code. However, since there are only four bits in the numeric code, when a numeric character is to be transmitted, its "8," "4," "2" and "1" bits are respectively sent to the inputs 45 of F/F's 5, 4, 3 and 2, these inputs corresponding to the inputs for the "4" bit, complement of the "2" bit, "2" bit and "1" bit, respectively, of the alpha transmission code. At the same time that the numeric code enters the register, a numeric SYNC bit is loaded to F/F6 through input 46. After loading, the bits are shifted through the register until the SYNC bit reaches F/F2, the bits leaving the register in bit serial form via output 41.

When a numeric character is being received in the shift register of FIG. 11, it enters the register in bit serial form through an input 47 at F/F5. At the same time a numeric SYNC bit is loaded to F/F4 through an input 48 and this leads the data through the register until it reaches F/F1. The arrival of the SYNC bit at F/F1 tells the register it is full and causes its contents to be sent to memory, the data being taken from the register in bit parallel form via the outputs 44 at F/F's 6, 5, 3 and 2. The outputs at F/F's 6 and 5 are utilized even though the numeric "8" and "4" bits have been shifted into F/F's 5 and 4, respectively, because circuit connections 49 and 50 are provided to send the contents of F/F5 back to the F/F6 output and of F/F4 back to the F/F5 output when the character being received is in numeric shift.

The means for effecting the conversion of the special numeric transmission code are circuits represented by the simplified logic diagram of FIG. 9. In this diagram, components 52, 53 and 54 are "and" gates each having four inputs. One of these inputs, designated "NTC," is common to all three gates and is rendered permissive by the numeric translate controls of the apparatus.

For component 52, the other three inputs are designated "2" bit, "4" bit and "8" bit, and the gate is permissed when the "2," "4" and "8" bits of the numeric character in the data recording machine's "A" register are all 0's. Since no input is provided for the "1" bit of the character, it is not known whether it is a 1 or a 0. Nevertheless, both of the first two characters in the left column of FIG. 8 (0000 and 0001) will satisfy the input requirements of gate 52, and if either is the character addressed the gate will be permissed.

The permiss of gate 52 will cause components 55 and 56 to go active and set shift register flip-flops 3 and 5, FIG. 11, the register flip-flops normally being set by a 1 and reset by a 0. Since F/F4 was not set by the permiss of gate 52, it remains in a reset condition with the result that F/F's 5, 4 and 3 read as though they contain the code 101. The "1" bit of the addressed character by-passes the FIG. 9 circuitry and is sent directly to the input of F/F2.

F/F2 of the shift register is normally in a set state at the time information is transferred to the register and therefore the input signal is put into the reset side of the flip-flop so that a 0 will cause it to reset while a 1 will not change it. Accordingly, if the "1" bit of the addressed character is a 0 (the first character in the left column of FIG. 8), F/F2 will be reset and F/F's 5, 4, 3 and 2 will read as though they contain the code 1010 which is the conversion shown on the FIG. 8 chart. On the other hand, if the "1" bit of the addressed character is a 1, F/F2 will remain set and F/F's 5, 4, 3 and 2 will read as though they contain the code 1011 which is the conversion shown for the second character (numeric 1) on the FIG. 8 chart.

The inputs to gate 53 of FIG. 9, in addition to the NTC input, are designated "1" bit, "2" bit and "4" bit, and the inputs to gate 54 are designated "1" bit, "2" bit and "8" bit. By an inversion relation between gates 53 and 54, both gates will be permissed if either a numeric 7 (0111) or a numeric 8 (1000) is the addressed character in the "A" register. The permiss of gate 53 causes component 57 to go active and set shift register flip-flop 5, FIG. 11. In addition, flip-flop 3 is reset as indicated at the output 58.

The permiss of gate 54 causes component 59 to go active and set shift register flip-flop 4. Accordingly, with gates 53 and 54 permissed, F/F's 5 and 4 are set and F/F3 is reset with the result that the three flip-flops read as though they contain the code 110. As noted above, the "1" bit of the addressed character by-passes the FIG. 9 circuitry and is sent directly to the input of F/F2. Therefore, if the "1" bit of the character is a 1 as in the case of a numeric 7, F/F2 will remain set and F/F's 5, 4, 3 and 2 will read as though they contain the code 1101 which is the conversion for numeric 7. Had the "1" bit of the addressed character been a 0 as in the case of a numeric 8, F/F2 would have been reset and F/F's 5, 4, 3 and 2 would have read as though they contained the code 1100 which is the conversion code for a numeric 8.

Conversion of the special numeric transmission code in the opposite direction is accomplished by circuits represented by the simplified logic diagram of FIG. 10. In this diagram, components 60, 61 and 62 are "and" gates each having three inputs from the receive data side of the shift register. Thus, gate 60 has inputs designated F/F2, F/F3 and F/F5; gate 61 has inputs F/F2, F/F4 and F/F5; and gate 62 has inputs $\overline{\text{F/F2}}$, F/F4 and F/F5. In addition, gates 60 and 61 have a common input designated "NS" which is rendered premissive when the apparatus is in numeric shift.

With the apparatus in numeric shift, if the numeric code received in the shift register has set F/F's 5, 3 and 2, gate 60 is permissed and has an output signal designated $\overline{\text{R1X11}}$, the R meaning receive, the first 1 meaning that the "8" bit is a 1 (because F/F5 is set), the X meaning that there is no input for F/F4 so it is not known whether the "4" bit is a 1 or 0, and the next two 1's meaning that the "2" bit and the "1" bit are both 1's. The output signal indicates, therefore, that the register contains a numeric conversion code that is either 1111 or 1011. Since the former is an invalid combination and the latter is the conversion code for a numeric 1, it can be presumed that the number in the register is a numeric 1 and this is established by circuitry (not shown) in the apparatus which checks the transfer gates to the data recording machine input.

If the code received in the shift register has set F/F's 5, 4 and 2, gate 61 is permissed and produces an output signal R11X1. In addition, it causes component 63 to go active and produce a signal $\overline{\text{R11X1}}$. As in the case of gate 60, these signals mean that the register contains a numeric conversion code that is either 1111 or 1101, and further that the number in the register is a numeric 7 (as established by transfer gate check).

In the same manner, gate 62 will be permissed if the code received in the shift register has set F/F's 5 and 4 and reset F/F2. This will result in an output signal $\overline{\text{R11X0}}$ which means that the code in the register is either 1110 or 1100 whereupon it will be established that the number in the register is a numeric 8 by the means above described.

With the above described special alpha and numeric transmission codes, the alpha code requires only eight bit positions of the transmitted bit frequency and the numeric code needs only four. This is because the alpha and numeric SYNC bits that are used to separate the characters in the transmitting and receiving shift registers are not transmitted over the line, and the result is the elimination of the need for conventional start, stop or marking bits or levels. This in turn increases the data to bit frequency ratio so that the user's cost for telephone equipment and time is lowered.

The special transmission codes (which it will be remembered were created to guarantee changes in the data wave form at intervals of no more than four bit times) also make possible checks for alpha and/or numeric errors and thereby increase the accuracy of the apparatus. These checks are at the receiving station and the circuitry for effecting them is represented by the logic diagram of FIG. 12. In this diagram, the top four components on the left—65, 66, 67 and 68—check to insure that only proper numeric combinations will be received, and the bottom four components—69, 70, 71 and 72—check to insure that there are no errors in the alpha characters received. All of these components are "and" gates with the first group having three inputs each and the second group having two inputs each.

The inputs to gate 65 are designated $\overline{\text{F/F3}}$, $\overline{\text{F/F4}}$ and $\overline{\text{F/F5}}$, the bar or line over the symbol meaning that these shift register flip-flops have not been set which is to say that each contains a 0. Since there is no input for F/F2, its contents are unknown and the code for F/F's 5, 4, 3 and 2 (the shift register flip-flops for the numeric code bits) can be written 000X which might be either 0000 or 0001. In either case, however, there are three consecutive 0 bits which is an invalid combination. Accordingly, if F/F's 3, 4 and 5 are in fact in a reset state, gate 65 will be permissed and activate an "or" gate 73 to which its output is connected.

Gate 66 has inputs designated F/F3, F/F4 and F/F5 and will be permissed if these flip-flops have been set. Here again, there is no input for F/F2 so a permiss of the gate will indicate that F/F's 5, 4, 3 and 2 contain code 111X which could be 1111 or 1110, both of which are invalid because of the three consecutive 1 bits. As with gate 65, the permiss of gate 66 will activate "or" gate 73.

The inputs to gate 67 are designated $\overline{\text{F/F2}}$, $\overline{\text{F/F3}}$ and $\overline{\text{F/F4}}$, there being no input for F/F5. Accordingly, if this gate is permissed it will indicate that F/F's 5, 4, 3 and 2 contain code X000 which is an invalid combination because of the three consecutive 0's. The output of gate 67 is also connected to gate 73 and will activate the latter if gate 67 is permissed.

The inputs to gate 68 are F/F2, F/F3 and F/F4 with no input for F/F5. Accordingly, if this gate is permissed it will indicate that the four flip-flops contain code X111 which is an invalid combination because of the three consecutive 1's. As with gates 65–67, the permiss of gate 68 will activate gate 73. Moreover, from the description of FIG. 12 so far, it can be seen that all possible invalid numeric combinations are covered by gates 65–68 and that the presence of any one of them in the receiver's shift register will cause gate 73 to be activated.

The output of gate 73 connects with the output of component 74 and together they provide the input for component 75. The input to component 74 is designated "NS" and the component is rendered permissive when the apparatus is in numeric shift. When components 73 and 74 activate component 75, the output signal from the latter sets the character error flip-flop (not shown). The component 76, the output of which is connected to the output of component 75, is permissed by signals from certain circuit operations which need not be described for an understanding of the FIG. 12 diagram.

Having reference now to the components for checking alpha character errors, the inputs to gate 69 are designated F/F3 and F/F4, there being input signals when these two flip-flops have been set, i.e., contain 1's. However, for an alpha character, F/F3 contains the "2" bit and F/F4 should contain the complement thereof as provided for by the special eight bit transmission code. Thus, the contents of the two flip-flops should never be the same and there is an error if both inputs for gate 69 are present and the gate is permissed. Similarly, if gate 70 is permissed, it will be because F/F's 3 and 4 are both reset, i.e., contain 0's, which is also an error in the character.

The inputs to gate 71 are designated F/F7 and F/F8 and the gate will be permissed if both of these flip-flops are set, i.e., contain 1's. With an alpha character, however, F/F7 contains the "A" bit and F/F8 should contain the complement thereof. Accordingly, the contents of the two flip-flops should never be the same and there is an error if gate 71 is permissed. Similarly, if gate 72 is permissed it will be because F/F's 7 and 8 are both reset (contain 0's) which is also an error condition.

Any time the complement for a "2" or an "A" bit is missing, therefore, one of the gates 69–72 will be permissed and cause an "or" gate 77 to go active. The output of gate 77 connects with the output of component 78 and together they provide an input for component 79. The input to component 78 is designated "AS" and the component is rendered permissive when the apparatus is in alpha shift. When components 77 and 78 activate component 79, the output signal for the latter, like the output of component 75, sets the character error flip-flop.

Figure 12:
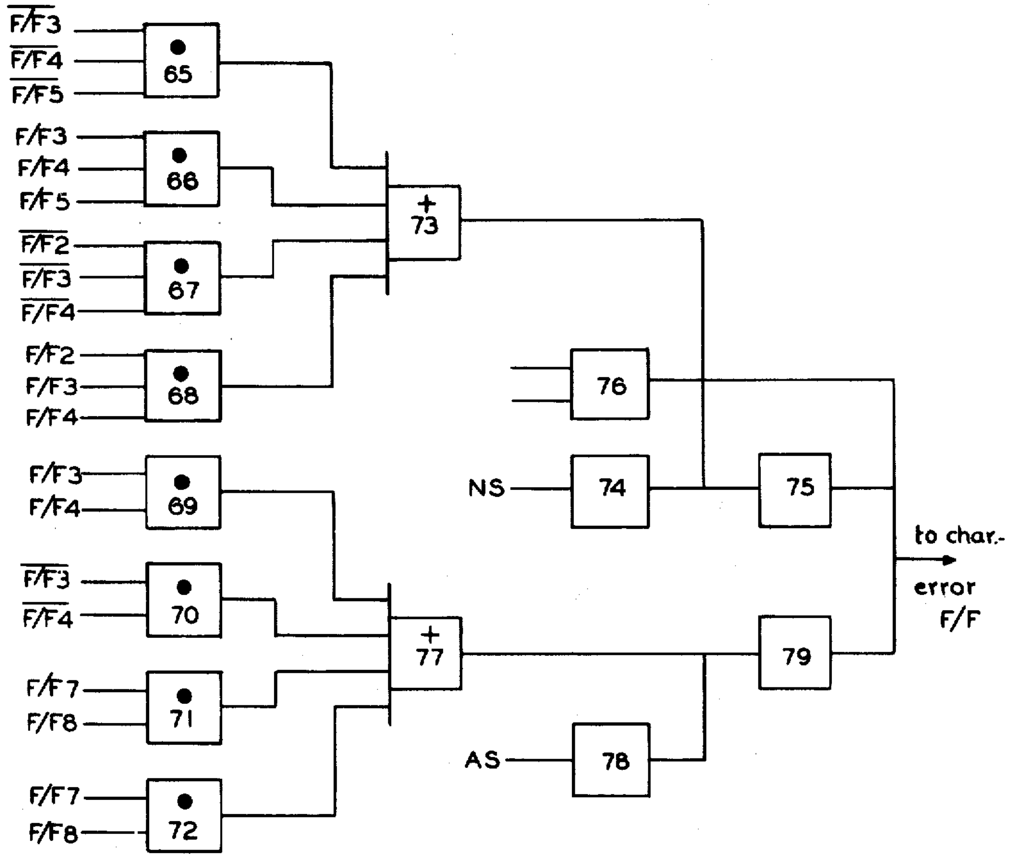
FIG. 12 is a simplified logic diagram illustrating the means for checking for alpha or numeric errors.

The circuits represented by the FIG. 12 logic diagram and the character error flip-flop form a part of the character validity checker mentioned above in connection with FIG. 3. Thus, setting the character error flip-flop causes a retransmission of the message through the basic controls of the apparatus, as previously described, and signals error at the keyboard indicator light 80, FIG. 2, the latter occurring at the receiver only.

The checks for alpha errors just described are a "bonus" that comes from the provision by the invention of the special eight bit transmission code. Thus, with eight bit characters, there should be 256 possible combinations of bits or 256 possible characters. However, by making two of the eight bits the complements of the "2" and "A" bits, the possible combinations are reduced to the original 64 that are possible with a six bit code. In other words, out of 256 possible combinations only 64 are valid and the remainder are screened out whenever the checking circuits (components 69–72, etc.) look for the complements and they do not appear. This limited but effective check eliminates the need for the conventional parity bit for each character and this in turn results in an increase in data transmission speed as noted before.

It has already been mentioned that at the start of transmission the transmitting station sends the receiving station one of two special message codes, i.e., either an ODD or an EVEN message code. At least three or more of these message codes will be sent to condition the receiver to receive data and also to make certain the line connection is good. After the receiver has successfully received three or more of the special message codes, it sends the transmitter a signal announcing its readiness to receive data.

The last-named signal is called a supervisory read data signal (SRD), and upon receiving it the transmitting apparatus sends the receiver a special ODD or EVEN sentinel code. This tells the receiver that data will follow so the receiver conditions itself to receive it.

The above-mentioned supervisory signal SRD remains active throughout the transmission of a data record and then, after a predetermined delay period, returns to its inactive state. This condition enables the transmitter to prepare its controlling flip-flop for sending the next record. Following the transmission of the last record and up until the time the signal SRD goes inactive, the transmitter sends wait codes to keep the receiver's clock synchronized.

Figure 14:
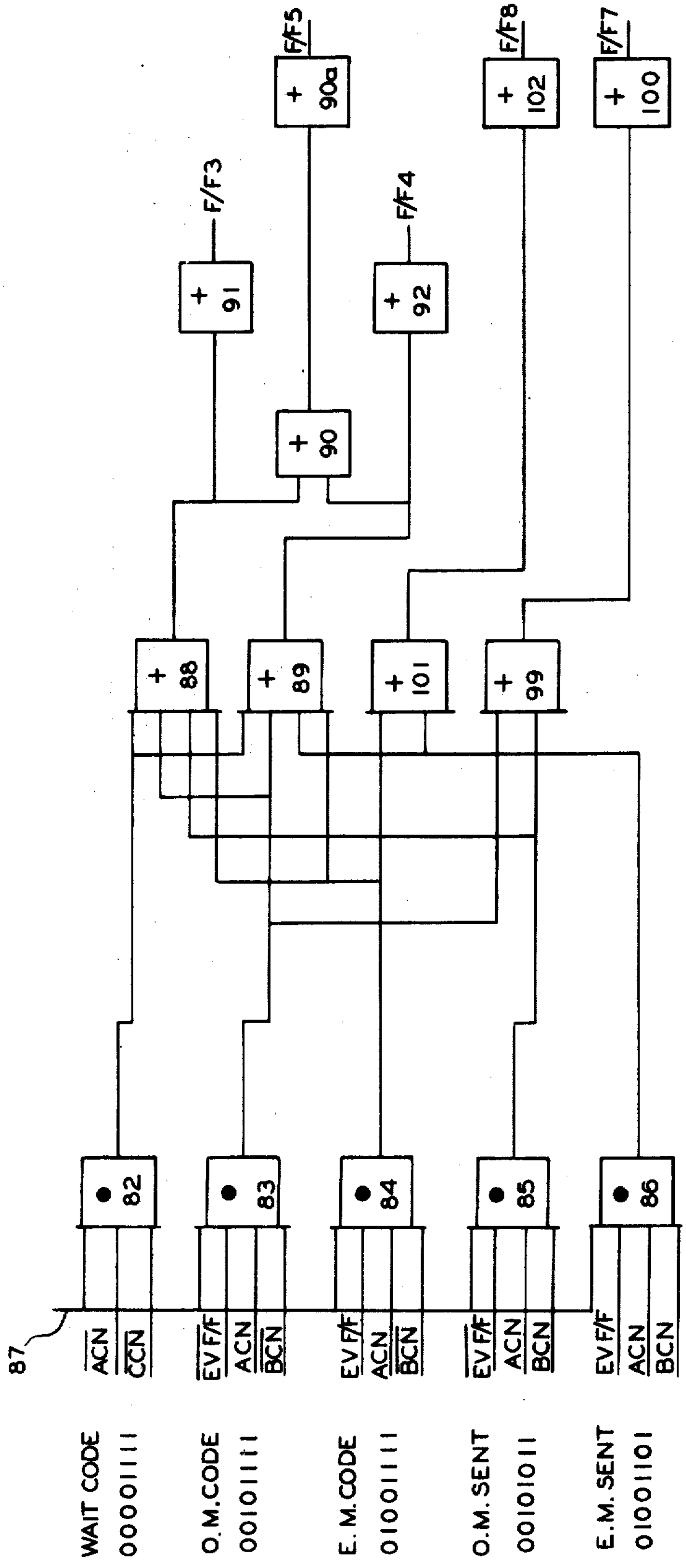
FIG. 14 is a simplified logic diagram illustrating the means for sending wait codes and ODD and EVEN message and sentinel codes.

The components for sending the wait codes are shown in the logic diagram of FIG. 14, the code being the eight bit combination 00001111 as indicated to the left of the diagram. The five gates 82–86 at the left of FIG. 14 are the code pre-set gates and all are "and" gates. Gate 82 controls the wait code transmission and has three inputs one of which, designated by reference number 87, is common to all the pre-set gates.

A permissive signal for input 87 is obtained in the following manner: When the last bit of the previous data record was shifted into flip-flop 2 of the shift register, F/F's 3–7 were left in a reset condition and this, at the "half-time" following the clock "shift-time," caused the synchronizing control flip-flop (SYNC F/F), not shown, to set. The setting of the SYNC F/F results in the permissive signal at input 87, and when the A control (ACN) and C control (CCN) flip-flops are reset, gate 82 is permissed. The A and C control flip-flops, together with a B control (BCN) flip-flop, are send control flip-flops (not shown) which control the transmission of the wait code, the ODD and EVEN message codes and the ODD and EVEN sentinal codes. At this time—after the SYNC F/F has been reset at the end of a record—the A, B and C control flip-flops are in a reset state.

When gate 82 is permissed, its output operates through components 88, 89, 90, **90*a*, 91 and 92 to pre-set shift register F/F's 3, 4 and 5. All of this occurs at clock "half-time," and since the last bit of the previous record was shifted to F/F2 of the shift register at the previous clock "shift-time," F/F2 is in its normal set state and need not be pre-set by means of gate 82. Accordingly, with F/F's 3, 4 and 5 pre-set by gate 82 and F/F2 normally set, the shift register contains the wait code 00001111. A wait code SYNC bit will be loaded to F/F9** of the register, and the code will be shifted through the register, all as described above in connection with an alpha character.

Wait codes will continue to be pre-set to the register and transmitted to the receiver until the previously mentioned delay period (caused by a delay flop, not shown) terminates. When this happens, it causes the supervisory signal SRD to go inactive; at the same time, it causes the SYNC F/F to set which in turn causes the ACN flip-flop to set. With the ACN flip-flop set, gate 82 is blocked and either gate 83 or gate 84 is rendered permissive depending on the state of the even message flip-flop (EV F/F) shown at 93 in FIG. 13. Thus, two of the inputs to gates 83 and 84 are the same, being ACN flip-flop set and BCN flip-flop reset. Only the third inputs differ, these being EV F/F reset for the ODD message code and EV F/F set for the EVEN message code, the barred and unbarred symbols representing the reset and set states, respectively.

Figure 13:
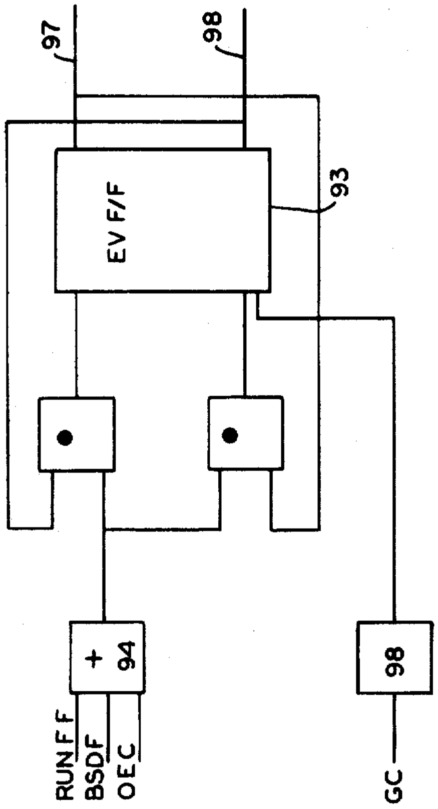
FIG. 13 is a simplified logic diagram illustrating the even message flip-flop and associated circuitry.

With reference now to FIG. 13, which is a logic diagram for the EV F/F circuitry, the diagram includes an "or" gate 94 having three inputs one of which is connected to the odd-even control (OEC) switch 95 on the keyboard, see FIG. 2. The other two inputs for gate 94 are from the run flip-flop (RUN F/F) and the back space delay flop (BSDF) of the data recording machine (neither shown). Below gate 94 is a component 96 having a single input which is the general clear (GC) signal. Components 94 and 96 are respectively connected to the set and reset sides of the EV F/F 93 and the latter has set and reset outputs 97 and 98, respectively. The EV F/F will normally come up in the reset (ODD) state because of the GC input to component 94. However, the flip-flop is toggled at the end of each record by the RUN F/F whereby it alternates between the ODD and EVEN states for successive records.

Referring again to FIG. 14, gate 83 will be permissed if EV F/F is in a reset state and this will cause the ODD message code 00101111 to be pre-set to the shift register. Thus, when the gate 83 is permissed, its output operates through components 88–92, 99 and 100 of the pre-set network to set shift register F/F's 3, 4, 5 and 7. As explained in connection with the wait code, F/F2 is already in its normal set state. If EV F/F is in the set state, gate 84 will be permissed and cause the EVEN message code 01001111 to be pre-set into the shift register. This will be accomplished through the network components 88–92, 101 and 102 causing F/F's 3, 4, 5 and 8 to set.

With the ACN and BCN flip-flops remaining set and reset, respectively, and the condition of the EV F/F unchanged, the transmitter will continue to send the ODD or EVEN message codes until it is signaled by the receiver that the supervisory signal SRD has again become active. As previously stated, at least three of the message codes must be sent before this can happen and the circuitry for recognizing the ODD or EVEN message code at the receiver and for counting the number of codes received (to distinguish from noise or data) is represented by the logic diagram of FIG. 15. In this diagram, "and" gates 103, 104 and 105 coact to recognize an ODD message code while gates 103, 104 and "and" gate 106 coact to recognize an EVEN message code.

Without going into all of the inputs to gate 103, it will suffice to say that under normal operating conditions this gate is pre-conditioned except for inputs F/F2, F/F5, $\overline{F/F6}$ and $\overline{F/F9}$. For gate 104 the inputs are, in addition to the gate 103 output F/F3 and F/F4. For gates 105 and 106 the inputs, in addition to the 104 output, are respectively, F/F7, $\overline{F/F8}$ and $\overline{F/F7}$ and F/F8. With the barred symbols representing the reset state and the unbarred symbols the set state as noted above, gate 105 will be rendered permissive when the code in the receiver's shift register is 00101111, i.e., the ODD message code. Similarly, gate 106 will be rendered permissive when the code is 01001111, the EVEN message code.

The message codes are counted by ODD code counter flip-flops A and B, designated by the reference numbers 107 and 108 or by EVEN code counter flip-flops A and B, reference numbers 109 and 110. Since the odd and even code counter circuits are symmetrical only one need be described, and it will be assumed that ODD message codes are being received. Initially both the A and B flip-flops 107 and 108 are reset. The first ODD message code that permisses gate 105 conditions gate 111 causing flip-flop 107 to set. The second ODD message code producing an output signal at gate 105 resets flip-flop 107 and causes flip-flop 108 to set. The third ODD message code sets flip-flop 107 without effecting flip-flop 108, and any codes thereafter cannot reset flip-flop 107 because flip-flop 108 has been set.

When flip-flop 108 sets (as a result of the second message code) it causes the supervisory signal SRD to go active and be sent to the transmitter. At the time the transmitter receives the signal, the next (third) ODD message code has already been pre-set in its shift register and when this code is received in the receiver's shift register it causes flip-flop 107 to set as previously noted. Recognition by the transmitter of the SRD signal causes the send control flip-flop BCN, FIG. 14, to set whereupon gate 83 is blocked and either gate 85 or 86 is rendered permissive depending on the state of the EV F/F.

Since nothing has happened to change the state of EV F/F, it will still be reset (assuming ODD message codes were sent) and gate 85 will be permissed causing the ODD sentinal code 00101011 to be sent. Thus, the output of gate 85 operates through components 88, 90, 90*a*, 91, 99 and 100 of the pre-set network to set shift register F/F's 3, 5 and 7, F/F2 already being in the set state as above described. If EV F/F had been in a set state, gate 86 would have been permissed and the EVEN sentinal code 01001101 would have been sent, the output of gate 86 operating through the network components 89, 90, 90*a*, 92, 101 and 102 to cause F/F's 4, 5 and 8 to set.

When the sentinal code is pre-set to the shift register of the transmitter, the send control flip-flop CCN is caused to set and this in turn causes the ACN flip-flop to reset at the following clock "half-time." With the CCN flip-flop set and the ACN flip-flop reset, the pre-set gates 82–86 are all blocked and the signal for sending the contents of the data recording machine "A" register to the transmitter's shift register becomes active. The first data character (alpha or numeric) is therefore loaded into the shift register.

Figure 15:
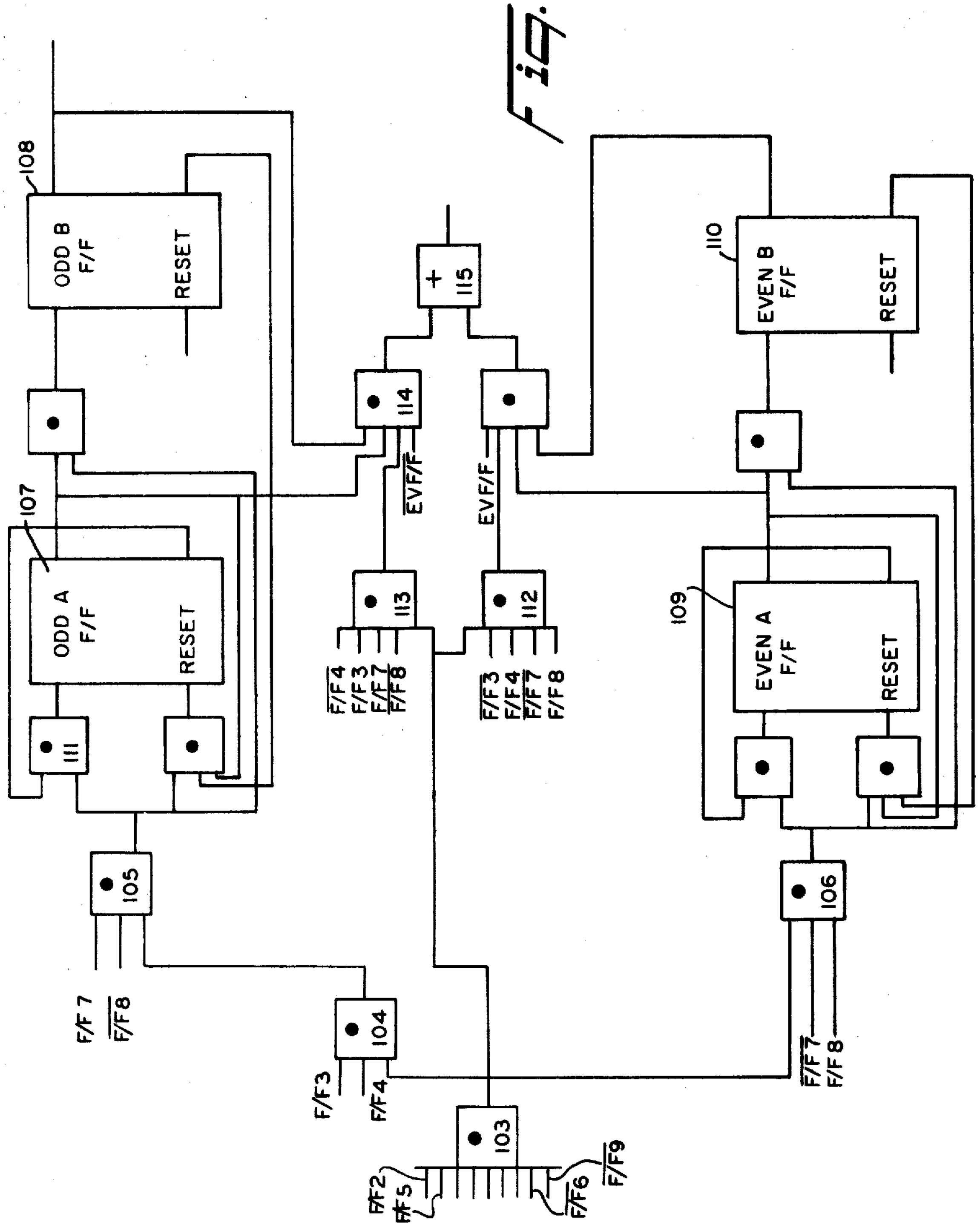
FIG. 15 is a simplified logic diagram illustrating the means for recognizing the ODD and EVEN message and sentinal codes and for counting the former.

When the sentinal code is received at the receiving station, FIG. 15, gate 103 will permiss but gate 104 will not because neither sentinal code provides that both F/F3 and F/F4 will be set. However, the output from gate 103 will pre-condition "and" gates 112 and 113, the former having inputs for recognizing the EVEN sentinal code and the latter inputs for recognizing the ODD sentinal code. In the case of an ODD sentinal code, therefore, gate 113 will permiss and, provided the EV F/F is still reset on gate 114, the "or" gate 115 will be rendered permissive. The permiss of gate 115 causes the receiver to be cleared to HOME, clears its character error flip-flop and shift register, and otherwise prepares it to receive data characters.

The above described ODD and EVEN message and sentinal codes and associated circuitry provide means for the apparatus to consider "odd" and "even" records alternately and to require proof of same preceding each new record. In the circuitry, a key element is the even message flip-flop 93 (EV F/F), FIG. 13, which is used whether the apparatus is sending or receiving and has as its primary purpose to insure that the terminals will not get out of step or confused in terms of message acknowledgements. At any time that it becomes necessary, the operator can actuate the odd-even control switch 95 on the keyboard, FIG. 2, to cause EV F/F to change its state. This may be necessary after manual intervention due to static interference or even loss of line connection.

The ODD and EVEN message codes are composed so that they cannot be confused with data characters and the codes will cause a transmission error at the receiver if the latter is in data mode. Thus, the four consecutive 1 bits at the low order end of each code would cause a character error to be signaled through the operation of gates 69–72 of FIG. 12. The proof of the ODD or EVEN message and sentinel codes is provided by the circuitry represented by FIG. 15 which, as described above, insures that each data record will be preceded by at least three message codes followed by one sentinal code, and this in turn insures that the terminals are in step.

It has been previously mentioned that the supervisory signal SRD remains active throughout the transmission of a data record and then, after a predetermined delay period, returns to its inactive state. The absence of the signal between consecutive records provides an important error check, and should it fail to become inactive the transmitter will be caused to return to the beginning of the same record and retransmit it starting with the message code. The circuitry for carrying out this check is represented by the logic diagrams of FIGS. 16 and 17. At the end of the transmission of a record, and following the transmission of the validity count, the transmitter sends the previously described wait codes until the delay flop (not shown) times out causing the signal SRD to go inactive. The delay flop has a 200 millisecond duration and during this time the receiver is in tape cycle writing the record it has received on tape.

Figure 17:
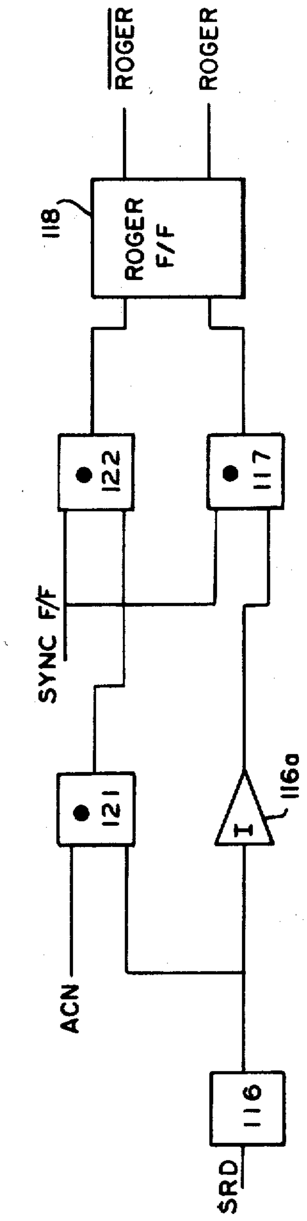

The supervisory signal is from the receiver to the transmitter and it is received by the latter at the input to gate 116, FIG. 17. When the signal goes inactive, an "and" gate 117 is pre-conditioned by inverter 116*a* so that the next time the previously mentioned synchronizing control flip-flop sets, gate 117 is permissed and the ROGER flip-flop 118 is reset. With the ROGER flip-flop reset, an "and" gate 119, FIG. 16, is rendered permissive, the other two inputs to this gate being present when the delay flop (DF) times out and because the apparatus is not conditioned to transmit data ($\overline{TXA}$). The permiss of gate 119 causes the send control flip-flop ACN to set whereupon the wait codes are terminated and either an ODD or EVEN message code is transmitted as previously described.

Below gate 119 is a gate 119*a* which will inhibit the functioning of gate 119 in the event of an error that causes the format error flip-flop (not shown) to set. In such case, however, the odd-even control switch 95, FIG. 2, can be moved into its "BYP" or error override (EOR) position. The switch has a momentary action which causes a single shot device 120, FIG. 20, to reset the error flip-flop. This can happen only once per switch depression and allows the operator to transmit one error record.

Under normal conditions, after at least three of the message codes have been sent, the signal SRD again goes active as described above and is again received at gate 116, FIG. 17. The output of gate 116 permisses gate 121 which was pre-conditioned when the ACN flip-flop set, and the output of gate 121 operates through gate 122 to cause the ROGER flip-flop to set. When the latter sets, the BCN flip-flop sets and with both the ACN and BCN flip-flops set, the transmitter sends the sentinal code.

In the event that the supervisory signal SRD does not go inactive at the end of a record, the ROGER flip-flop does not reset and this in turn results in a failure of the RUN flip-flop to set. Since the latter is a necessary input to gate 94, FIG. 13, the EV F/F will not be toggled and the next record will not be read into memory. As a result of the latter, the same record will be re-transmitted with a start that is identical to the start of a message that follows an acknowledged message (acknowledgment normally being provided by the absence of the supervisory signal at the end of a message).

Figure 18:
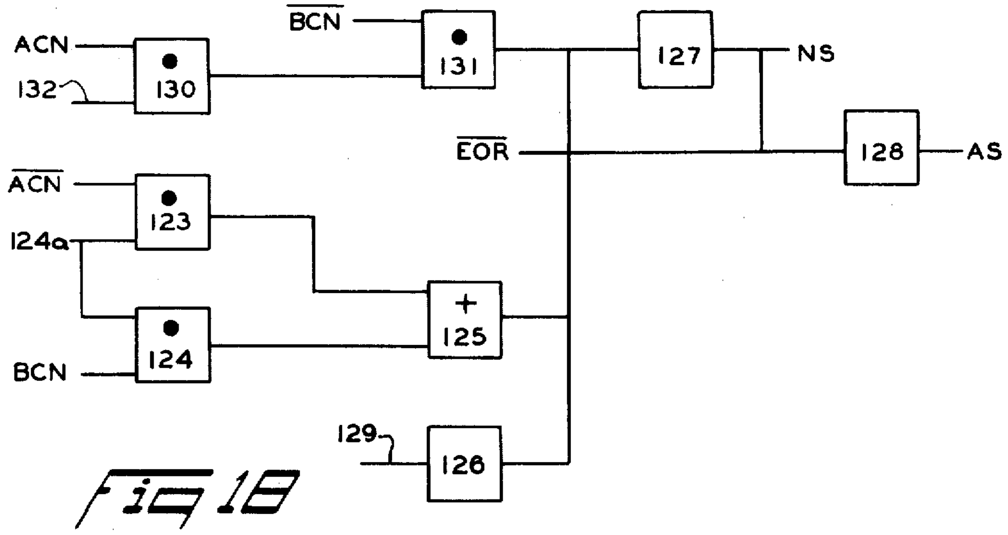
FIG. 18 is a simplified logic diagram illustrating the means which permits programmed numeric and alpha data to be in any combination desired.

The apparatus of the invention includes means which allow programmed numeric and alpha data to be intermixed in any combination desired. The circuitry which permits this is represented by the logic diagram of FIG. 18. In this diagram, gates 123 and 124 have inputs which are flip-flop ACN reset and flip-flop BCN set, respectively, and a common input 124*a* which is present when the apparatus is conditioned to transmit data. Prior to sending the wait codes, the BCN flip-flop is reset and this signal together with a low input on 124*a* causes gates 123 and 124, which operate through an "or" gate 125, to block the output of gate 126 and jam the outputs of gates 127 and 128 in their active conditions, the latter two gates having outputs NS (numeric shift) and AS (alpha shift), respectively. This prepares shift register flip-flop 9, FIG. 11, to receive alpha SYNC bits for transmitting wait codes and ODD or EVEN message and sentinal codes.

After the sentinal code has been sent and the preset gates 82–86 are all blocked, the ACN flip-flop is reset and the BCN flip-flop is set whereby gates 122 and 123 operate to allow the NS and AS outputs of gates 127 and 128 to be entirely controlled by the input 129 to gate 126 which is controlled by the format (program) register. Thus, during data transmission, programmed numeric and alpha data can be intermixed as desired. At the end of the transmission of a record, the BCN flip-flop is reset which will cause gate 123 to jam the output of gate 128 in its active state so that the validity count is loaded into the transmitter's shift register under alpha conditions. In the receiver, just prior to receiving data, its ACN flip-flop is set and this causes gate 130 to operate through gate 131 and allow the NS and AS outputs to be entirely controlled by the format register during the receipt of data. The other input 132 to gate 131 is present when the apparatus is conditioned to receive data.

Means are provided in the apparatus whereby the transmitting station checks data programmed for numeric transmission to be sure that it includes only the numeric digits 0 through 9. In the event that an error is found in this check, it will cause transmission to stop and operator attention will be required.

Figure 19:
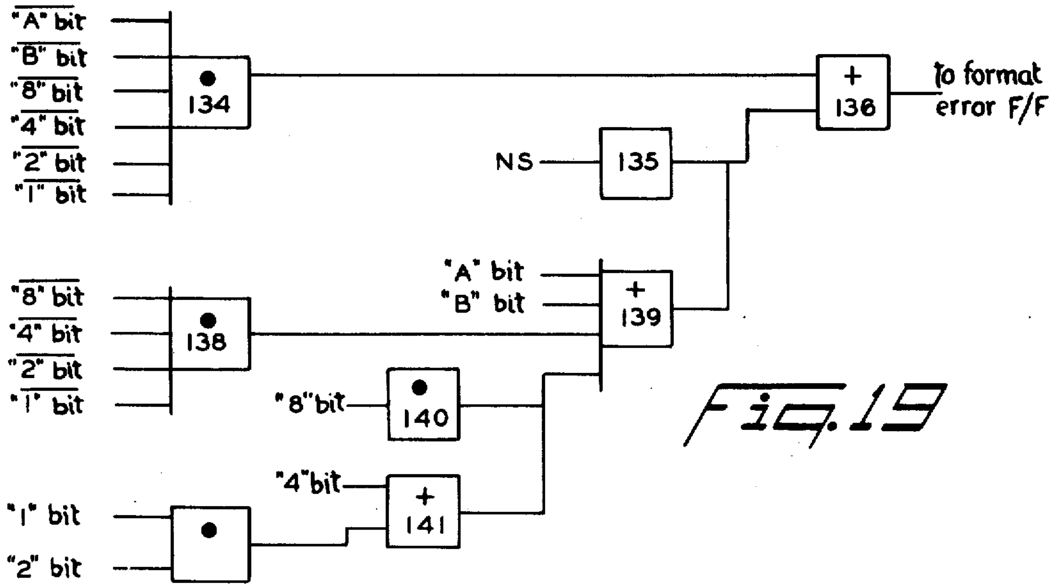
FIG. 19 is a simplified logic diagram illustrating the means by which data programmed for numeric transmission can be checked to be sure that it includes only numeric digits 0 through 9.

The circuitry for effecting this numeric check is represented by the logic diagram of FIG. 19. In this diagram, the "and" gate 134 has inputs designated $\overline{\text{"A"}}$ bit, $\overline{\text{"B"}}$ bit, $\overline{\text{"8"}}$ bit, $\overline{\text{"4"}}$ bit, $\overline{\text{"2"}}$ bit and $\overline{\text{"1"}}$ bit, the barred symbols meaning the absence of a 1 bit or, in other words, that the code is all 0's, i.e., a blank. With this condition, and the gate 135 being rendered permissive by the fact that the data is programmed for numeric transmission (NS input), gate 136 is permissed causing its output to set the format error flip-flop and signal error on the keyboard indicator 137.

Below gate 134, an "and" gate 138 will be permissed if the "8," "4," "2" and "1" bits are all 0's and its output, or the presence of an "A" or "B" bit, will permiss the "or" gate 139. The output of gate 139, together with the NS input to gate 135 renders gate 136 permissive and sets the format error flip-flop. The "or" gate 139 will also be permissed if gates 140 and 141 below it are both permissed, gate 140 being permissed if the "8" bit is a 1 and gate 141 being permissed if either the "4" bit is a 1 or the "2" and "1" bits are both 1's. This would also be an error since the numeric total of the inputs to gates 140 and 141 would be either 11 or 12 which is not permitted.

While the logic diagrams disclosed in the drawings show various inputs and signals as switching from a low to a high state or vice versa, or from a reset to a set state or vice versa, it will be understood that the polarity can be reversed in any circuit without making a material change in the arrangement or operation of the circuit.

From the foregoing description, it will be apparent that the data communication apparatus of the invention provides a novel and highly useful machine that is capable of performing in a versatile yet very efficient manner. As will be understood by those familiar with the art, the invention may be embodied in other specific forms without departing from the spirit or essential characteristics thereof. The embodiment disclosed is, therefore, to be considered in all respects as illustrative rather than restrictive, the scope of the invention being indicated by the appended claims.

What is claimed is:

1. In a data communication apparatus capable of both transmitting and receiving information, said apparatus being adapted to operate in conjunction with a telephone data set for utilization of telephone communication facilities, said apparatus including a magnetic core memory arranged to receive data from or send data to magnetic tape: the improvement comprising a shift register for converting data from bit parallel to bit serial form and vice versa; circuit means for moving data between said memory and the register in bit parallel form; circuit means for moving data between the register and the data set in bit serial form; an oscillator for controlling the frequency of the register; and means, when the apparatus is operating as a receiver, to synchronize its oscillator with that of the transmitting apparatus, said last-named means being responsive to a change in the wave form of the incoming data.

2. Apparatus as defined in claim 1 wherein the incoming data enters a portion of the oscillator and said synchronizing means includes means whereby a differentiated change corrects the oscillator whenever there is a change of wave form.

3. Apparatus as defined in claim 1, the improvement including means for causing the data wave form to change at intervals of no more than four bit times.

4. Apparatus as defined in claim 3 wherein said wave form changing means includes a circuit network for converting four bit numeric characters having more than two consecutive bits of the same kind to special transmission numeric characters containing not more than two consecutive bits of the same kind.

5. Apparatus as defined in claim 3 wherein said wave form changing means includes means for converting six bit alpha characters into eight bit alpha characters containing no more than two consecutive bits of the same kind at the ends of the characters.

6. Apparatus as defined in claim 5 wherein said alpha character conversion means includes a pair of flip-flops in said shift register for inserting the complements of the "2" and "A" bits in the six bit code following the "2" and "A" bits thereof.

7. In a data communication apparatus capable of both transmitting and receiving data records: a first circuit network for transmitting special odd or even message codes preceding each record, means coacting with said circuit network to cause alternate transmission of said odd and even message codes preceding a series of consecutive records, and a second circuit network for comparing the odd-even status of the receiver with the transmitter so that the two terminals do not get out of step.

8. Apparatus as defined in claim 7 wherein said means coacting with said first circuit network is a message control flip-flop, said apparatus also having circuit means operable to toggle said flip-flop at the end of each record.

9. Apparatus as defined in claim 8 wherein said special odd and even message codes are eight bit codes, said apparatus including means for transmitting at least three of said codes prior to sending a data record.

10. Apparatus as defined in claim 9 together with circuit means for sending a supervisory signal from the receiver to the transmitter, and means to activate the last-named circuit means after the transmitter has sent at least three of the special message codes.

11. Apparatus as defined in claim 10 together with additional circuit means which normally causes said supervisory signal to become inactive at the end of each data record.

12. Apparatus as defined in claim 11 together with means operable in the event of a failure of the supervisory signal to become inactive at the end of a record to inhibit the toggling of said message control flip-flop.

13. In a data communication apparatus for transmitting and receiving data, said apparatus including a memory for storing data, the memory also having means for storing program patterns: a first circuit means for conditioning the apparatus for numeric shift, a second circuit means for conditioning the apparatus for alpha shift, and a circuit network operable to jam the second circuit means in its active condition when the apparatus is transmitting special message codes, said circuit network also being operable when the message is conditionad to transmit data characters to inhibit said first and second circuit means and permit the shift condition of the apparatus to be entirely controlled by the memory program patterns.

14. In a data communication apparatus capable of both transmitting and receiving information: a first gate network for converting a standard four bit numeric code into a special four bit numeric transmission code no character of which contains more than two consecutive bits of the same kind, a second gate network for converting the special transmission code back to the standard code, and a third gate network operable when the apparatus is transmitting data to check data programmed for numeric transmission and signal error if it includes anything other than numeric digits 0 through 9.

15. In a data communication apparatus capable of both transmitting and receiving information: Circuit means in said apparatus for converting a standard six bit alpha code into a special eight bit alpha transmission code having no more than two consecutive bits of the same kind at the ends of its characters, said alpha code conversion means including circuits for inserting the complements of the "2" and "A" bits thereof; and a gate network for checking the presence of said complements in the code character and for signalling an error if a complement is absent.

16. Apparatus as defined in claim 15 and further including additional circuit means for converting a four bit numeric code into a special four bit numeric transition code no character of which contains more than two consecutive bits of the same kind.

17. In a data communication apparatus capable of both transmitting and receiving information: circuit means for converting a four bit numeric code into a special four bit numeric transmission code no character of which contains more than two consecutive bits of the same kind; and a gate network for checking for the presence of more than two consecutive bits of the same kind in a numeric character and for signalling an error if such is found.

18. Apparatus as defined in claim 17 and including further circuit means for converting a standard six bit alpha code into a special eight bit alpha transmission code having no more than two consecutive bits of the same kind at the ends of its characters.

References Cited

UNITED STATES PATENTS

| | | | |
|---|---|---|---|
| 3,057,962 | 10/1962 | Mann et al. | 179—15 |
| 3,403,377 | 9/1968 | Connolly et al. | 340—146.1 |
| 3,436,480 | 4/1969 | Pan | 178—69.5 |

MALCOLM A. MORRISON, Primary Examiner

C. E. ATKINSON, Assistant Examiner

U.S. Cl. X.R.

178—69.5; 340—172.5